United States Patent
Chiao et al.

(10) Patent No.: US 8,972,705 B2
(45) Date of Patent: Mar. 3, 2015

(54) EXECUTING INSTRUCTIONS FOR MANAGING CONSTANT POOL BASE REGISTER USED FOR ACCESSING CONSTANTS DURING SUBROUTINE EXECUTION

(75) Inventors: Wei-Hao Chiao, Hsinchu (TW); Haw-Luen Tsai, Taipei (TW); Chen-Wei Chang, Taoyuan County (TW); Hong-Men Su, Hsinchu County (TW)

(73) Assignee: Andes Technology Corporation, Hsin-Chu (TW)

( * ) Notice: Subject to any disclaimer, the term of this patent is extended or adjusted under 35 U.S.C. 154(b) by 553 days.

(21) Appl. No.: 13/298,023

(22) Filed: Nov. 16, 2011

(65) Prior Publication Data
US 2013/0124836 A1    May 16, 2013

(51) Int. Cl.
| G06F 9/35 | (2006.01) |
| G06F 9/30 | (2006.01) |
| G06F 9/46 | (2006.01) |
| G06F 9/355 | (2006.01) |

(52) U.S. Cl.
CPC .......... *G06F 9/30167* (2013.01); *G06F 9/461* (2013.01); *G06F 9/3557* (2013.01)
USPC .......... 712/225; 712/228; 712/E9.04

(58) Field of Classification Search
None
See application file for complete search history.

(56) References Cited

U.S. PATENT DOCUMENTS

| 7,755,636 | B1 * | 7/2010 | Lindholm et al. | 345/582 |
| 8,365,156 | B2 * | 1/2013 | Sollich | 717/146 |
| 8,533,433 | B2 * | 9/2013 | Strom | 712/209 |

* cited by examiner

*Primary Examiner* — Kenneth Kim
(74) *Attorney, Agent, or Firm* — WPAT, P.C.; Anthony King; Kay Yang

(57) ABSTRACT

A constant data accessing system having a constant pool comprises a computer processor having a constant pool base register, a compiler having a constant pool handler, and an instruction set module having a constant pool instruction set unit. The constant pool base register is configured to store a value of constant pool base address of one or a plurality of subroutines which have constants to be accessed.

15 Claims, 14 Drawing Sheets

Load Upper Immediate (LUI)

| LUI 001111 | 0 00000 | rt | Immediate |
|---|---|---|---|
| 31  26 | 25  21 | 20  16 | 15  0 |
| 6 | 5 | 5 | 16 |

Or Immediate (ORI)

| ORI 001101 | rs | rt | Immediate |
|---|---|---|---|
| 31  26 | 25  21 | 20  16 | 15  0 |
| 6 | 5 | 5 | 16 |

FIG. 1 (Prior Art)

EXECUTING INSTRUCTIONS FOR MANAGING CONSTANT POOL BASE REGISTER USED FOR ACCESSING CONSTANTS DURING SUBROUTINE EXECUTION

BACKGROUND OF THE INVENTION

1. Field of the Invention

The current disclosure relates to a constant data accessing system and, in particular, to a constant data accessing system managing a value of constant pool base address in a constant pool base register.

2. Description of the Related Art

MIPS32 uses a conventional constant accessing method that constructs a 32-bit constant by two 32-bit instructions, Load Upper Immediate (LUI) and Or Immediate (ORI). In FIG. 1, LUI carries the top-half of the 32-bit constant and ORI carries the bottom-half of the 32-bit constant. The code size for constructing the 32-bit constant is 8 bytes.

Another one related art is program-counter-relative data access. X86-64, ARM, and DEC VAX support this instruction type. When program-counter-relative data access is used, compiler places the constants in a constant pool before or after the subroutine that uses the constants. And then, use program-counter-relative instructions to access the constants.

FIG. 2 schematically illustrates an example that how to use program-counter-relative instructions. The upper part 11 shows a C computer program code that defines a simple subroutine operable to retrieve a global variable "global_var" to increment its value and to store it back to memory. The lower part 13 illustrates an ARM assembly code equivalent to the C computer program code.

In the assembly code, the data at address 0x100 is the initialized value zero of the global variable "global_var". The address of the global variable "global_var" is a constant data put at address 0x00c. The address of the global variable "global_var" is loaded by the program-counter-relative load instruction at address 0x000. Therefore, the code size of accessing the constant data is 6-bytes.

However, when the code size of the subroutine is very large, the address distance from the program-counter-relative load instruction to the address of the constant also becomes longer. In this case, the instruction size of the program-counter-relative load instruction is 4 bytes. Therefore, in this case, the code size of accessing the constant data is 8-bytes.

In order to improve the conventional constant accessing, there is a need for a constant data accessing system and method thereof.

SUMMARY OF THE INVENTION

The present invention discloses a constant data accessing system that comprises a compiler having a constant pool handler; an instruction set module having a constant pool base register management instruction set unit and a constant pool access instruction set unit; and a computer processor having a constant pool base register. The constant pool base register is configured to store a value of constant pool base address of one or a plurality of subroutines which have constants to be accessed. The constant pool handler is configured to manage and access the constants in one or a plurality of subroutines.

The present invention discloses a computer processor supporting an instruction set module that comprises a constant pool base register is configured to store a value of a constant pool base address of one or a plurality of subroutines having constants being accessed. The instruction set module has a constant pool base register management instruction set unit and a constant pool access instruction set unit.

The present invention discloses a method of constant data accessing of one or a plurality of subroutines that comprises the steps of placing one or a plurality of constants in a constant pool; determining a value of constant pool base address; managing the value in a constant pool base register; and accessing the one or the plurality of constants with involving the constant pool base register. The step of managing the value in a constant pool base register comprises setting, saving, and restoring the value in the constant pool base register.

In order to have further understanding of the techniques, means, and effects of the current disclosure, the following detailed description and drawings are hereby presented, such that the purposes, features and aspects of the current disclosure may be thoroughly and concretely appreciated; however, the drawings are provided solely for reference and illustration, without any intention to be used for limiting the current disclosure.

BRIEF DESCRIPTION OF THE DRAWINGS

The objectives and advantages of the present invention are illustrated with the following description and upon reference to the accompanying drawings in which:

FIG. 1 schematically illustrates a conventional constant accessing method having a 32-bit constant constructed by two 32-bit instructions;

DETAILED DESCRIPTION OF THE INVENTION

The present invention discloses a constant data accessing system.

Figure 2:
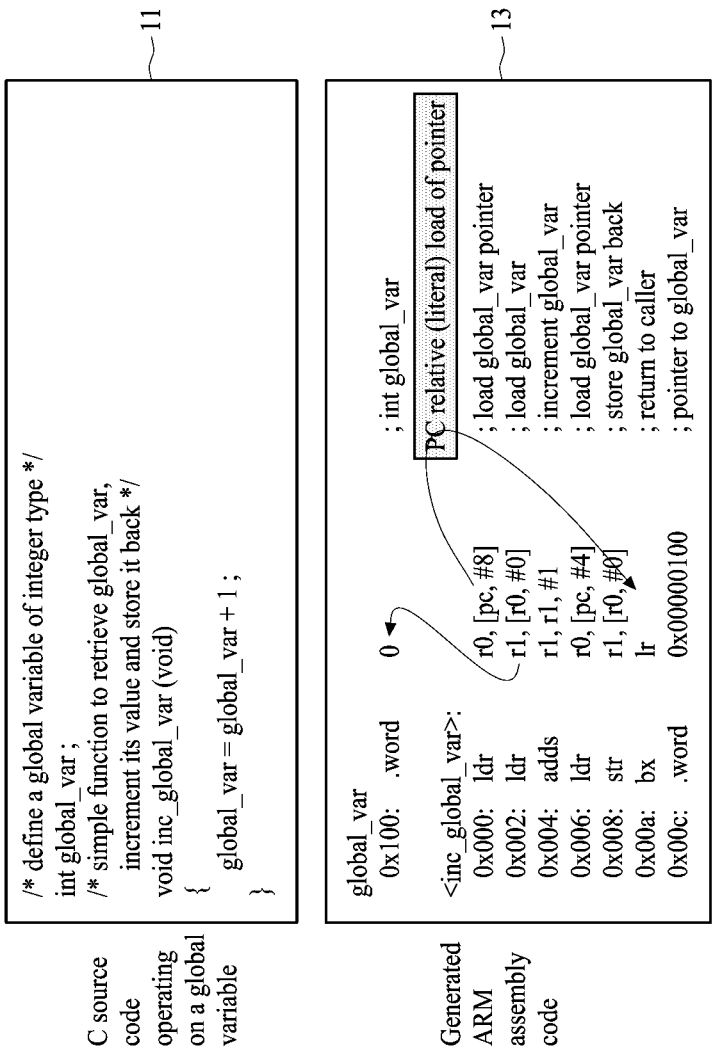
FIG. 2 illustrates a conventional constant accessing by program-counter-relative instructions.
Figure 3:
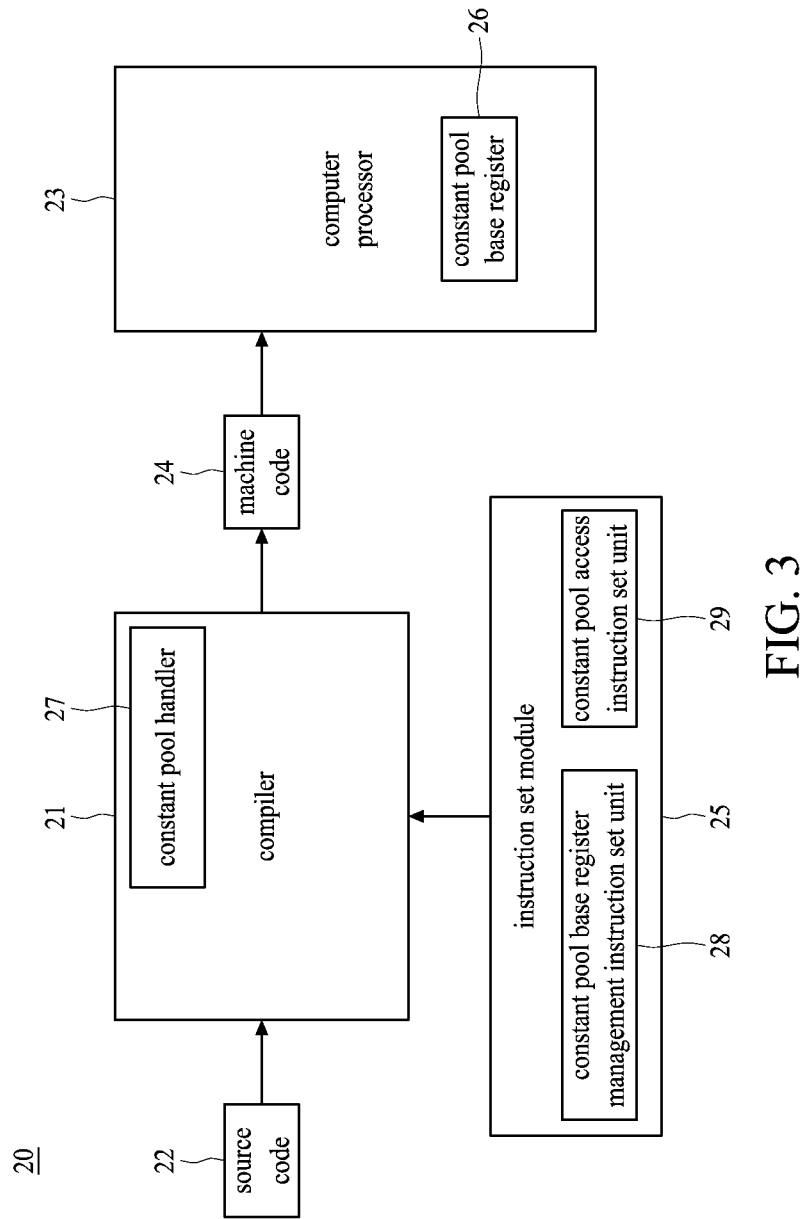
FIG. 3 schematically illustrates one embodiment of the present invention.

FIG. 3 schematically illustrates one embodiment of the current disclosure. The system 20 includes a computer processor 23 having a constant pool base register 26, a compiler 21 having a constant pool handler 27, and an instruction set module 25 having a constant pool base register management instruction set unit 28 and a constant pool access instruction set unit 29. The constant pool base register 26 is configured to store a value of constant pool base address of one or a plurality of subroutines which have constants to be accessed, wherein the constant pool base register 26 is a specific register or one of a plurality of general purpose registers in the computer processor.

In the system 20, the main function of the compiler 21 is to compile a source code 22 to a machine code 24 which is executable by the computer processor 23. The compiler 21 uses the instruction set module 25 to compile the source code 22.

Figure 4:
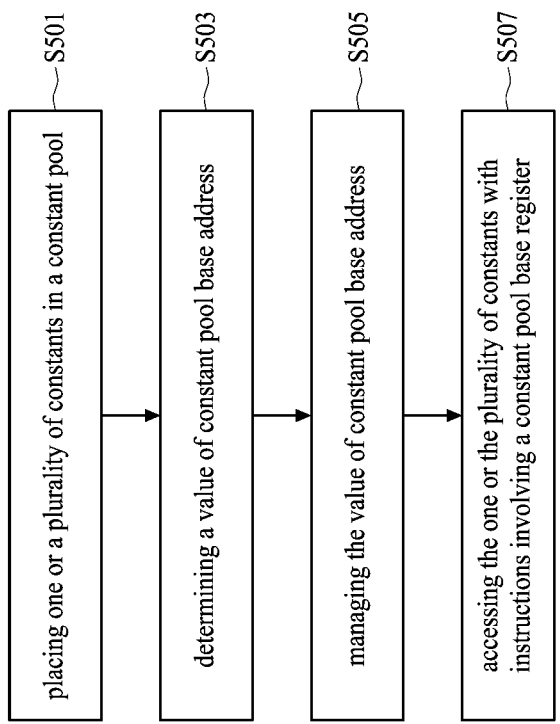
FIG. 4 illustrates a flow chart of constant data accessing of one or a plurality of subroutines of one embodiment of the constant pool handler in the present invention.

In the compiler 21, the main function of the constant pool handler 27 is to manage and access the constants in one or a plurality of subroutines. FIG. 4 illustrates a flow chart of constant data accessing of one or a plurality of subroutines of one embodiment of the constant pool handler 27. The constant data accessing process includes the following steps. In Step S501, one or a plurality of constants is placed in a constant pool. In Step S503, a value of constant pool base address is determined. In Step S505, the value of constant pool base address is managed, wherein managing the value of constant pool base address comprises setting, saving, and restoring the value of constant base address in the constant pool base register. In Step S507, the one or the plurality of constants is accessed by instructions in constant pool access instruction set unit 29.

Figure 5:
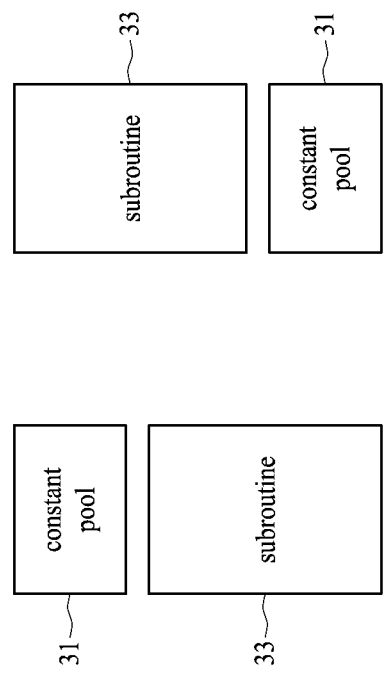
FIG. 5 schematically illustrates the constant pool location in accordance with one embodiment of the present invention.

In Step S501, one or a plurality of constants is placed in a constant pool. FIG. 5 schematically illustrates the constant pool location in accordance with one embodiment of the present invention. The constant pool 31 is located before or after a subroutine 33.

Figure 6:
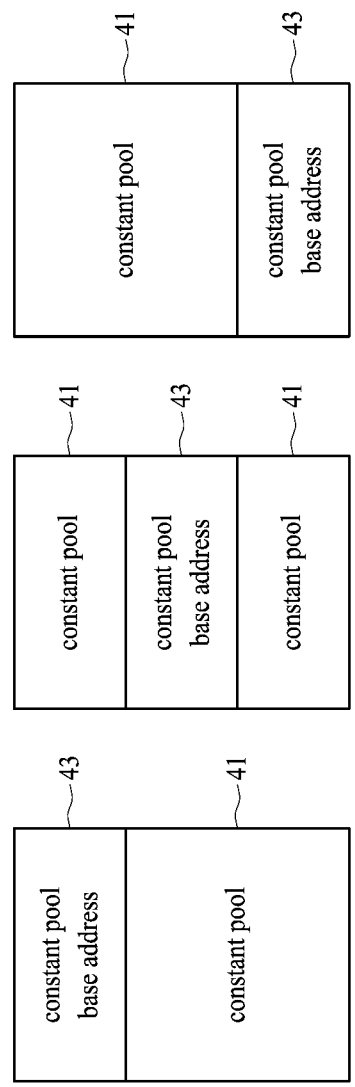
FIG. 6 schematically illustrates the constant pool base address location in accordance with one embodiment of the present invention.

In Step S503, a value of constant pool base address is determined. FIG. 6 schematically illustrates the constant pool base address location in accordance with one embodiment of the present invention. The constant pool base address 43 is located before the starting address of a constant pool 41, or equal to the starting address of a constant pool 41, or between the starting address of a constant pool 41 and the ending address of another constant pool 41, or equal to the ending address of a constant pool 41, or after the ending address of a constant pool 41.

The constant pool base register 26 is configured to store a value of constant pool base address of one or a plurality of subroutines which have constants to be accessed. When the program flow enters to a new subroutine upon subroutine call or subroutine return, the content of constant pool base register 26 should be managed by instructions in constant pool base register management instruction set unit 28; shown in Step S505. The constant pool base register management comprises saving caller's constant pool base register before setting callee's constant pool base register by Push-CPBR instruction either in caller or in callee; setting the callee's constant pool base register before the first constant access of the callee by Call-and-Set-CPBR instruction upon subroutine call in caller or by Set-CPBR instruction in callee; restoring the caller's constant pool base register after a last constant access of the callee and before a next constant access of the caller by Pop-CPBR instruction in callee, or by Pop-CPBR-and-return instruction upon return in callee, or by Pop-CPBR in caller.

Moreover, for further code size reduction purpose, saving caller's constant pool base register before setting callee's constant pool base register by Push-CPBR instruction in caller, and setting the callee's constant pool base register before the first constant access of the callee by Call-and-Set-CPBR instruction upon subroutine call in caller can be performed with a single instruction by Push-CPBR-and-Call-and-Set-CPBR in caller. Saving caller's constant pool base register before setting callee's constant pool base register by Push-CPBR instruction in callee, and setting the callee's constant pool base register before the first constant access of the callee by Set-CPBR instruction in callee can be performed with a single instruction by Push-CPBR-and-Set-CPBR in callee.

Figure 7:
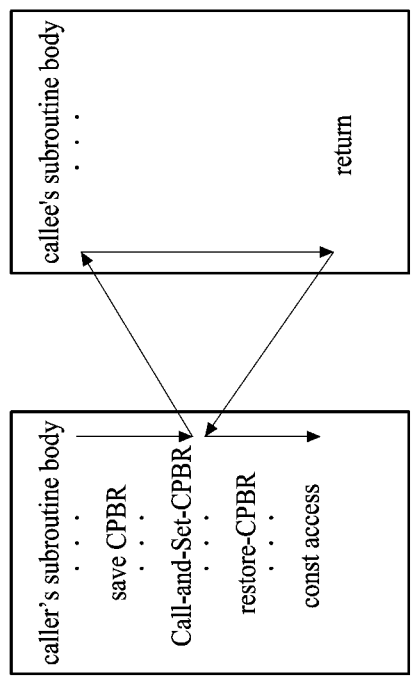
FIG. 7 illustrates setting, saving, and restoring the value of constant base address in subroutines.
Figure 8:
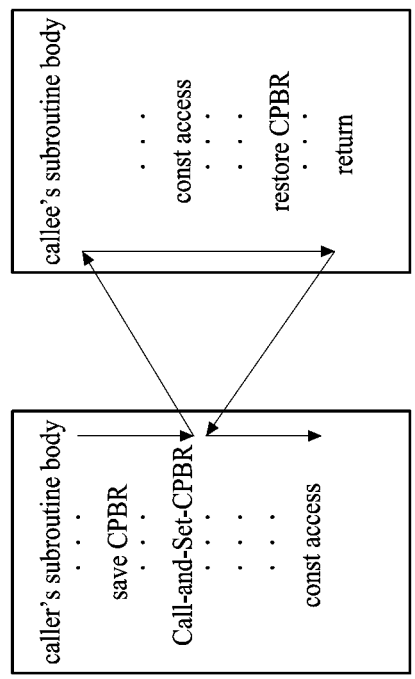
FIG. 8 illustrates setting, saving, and restoring the value of constant base address in subroutines.
Figure 9:
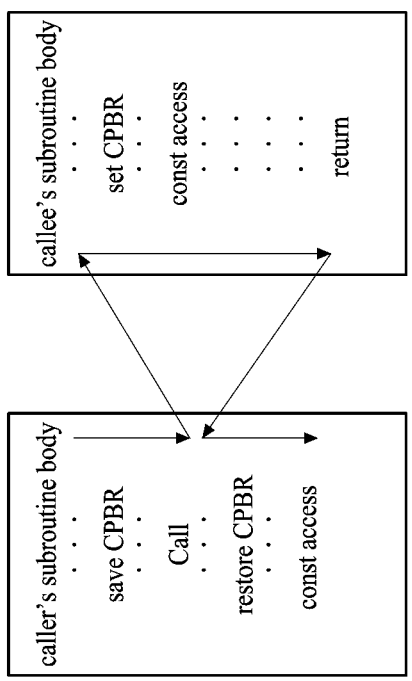
FIG. 9 illustrates setting, saving, and restoring the value of constant base address in subroutines.

The following figures are combinations of constant pool base register manager in the caller's subroutine body and in the callee's subroutine body. FIG. 7 illustrates setting, saving, and restoring the value of constant base address in subroutines. In FIG. 7, saving, setting and restoring the value of constant pool base address are in the caller's subroutine body. FIG. 8 illustrates setting, saving, and restoring the value of constant base address in subroutines. In FIG. 8, saving and setting the value of constant pool base address are in the caller's subroutine body, and restoring the value of constant pool base address is in the callee's subroutine body. FIG. 9 illustrates setting, saving, and restoring the value of constant base address in subroutines. In FIG. 9, saving and restoring the value of constant pool base address are in the caller's subroutine body, and setting the value of constant pool base address is in the callee's subroutine body.

Figure 10:
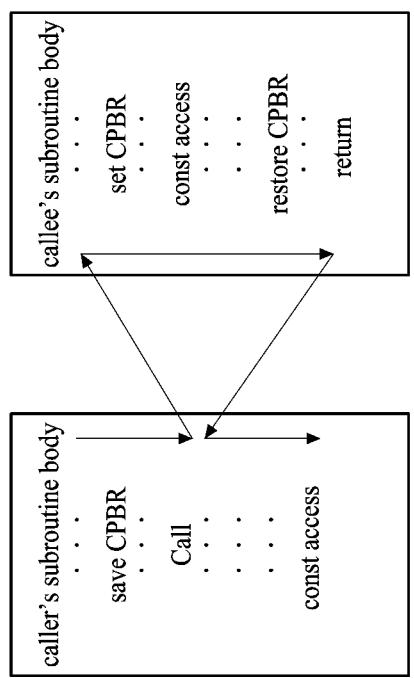
FIG. 10 illustrates setting, saving, and restoring the value of constant base address in subroutines.
Figure 11:
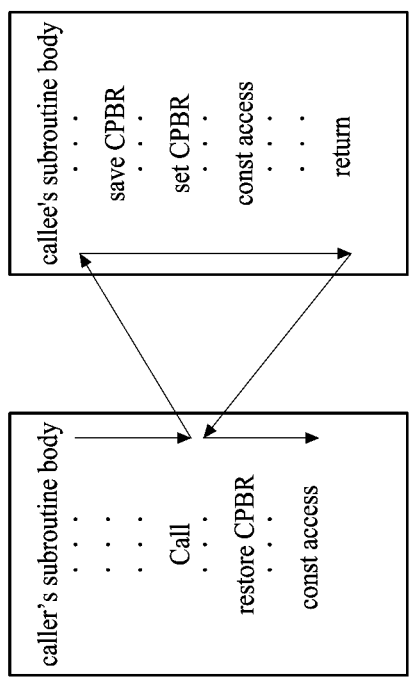
FIG. 11 illustrates setting, saving, and restoring the value of constant base address in subroutines.

FIG. 10 illustrates setting, saving, and restoring the value of constant base address in subroutines. In FIG. 10, saving the value of constant pool base address is in the caller's subroutine body, and setting and restoring the value of constant pool base address are in the callee's subroutine body. FIG. 11 illustrates setting, saving, and restoring the value of constant base address in subroutines. In FIG. 11, restoring the value of constant pool base address is in the caller's subroutine body, and saving and setting the value of constant pool base address are in the callee's subroutine body.

Figure 12:
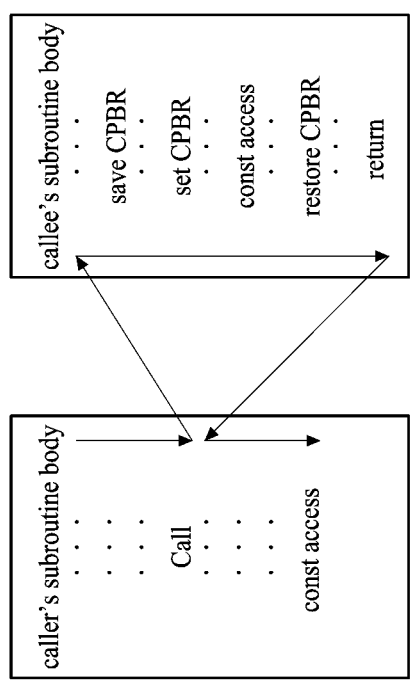
FIG. 12 illustrates setting, saving, and restoring the value of constant base address in subroutines.
Figure 13:
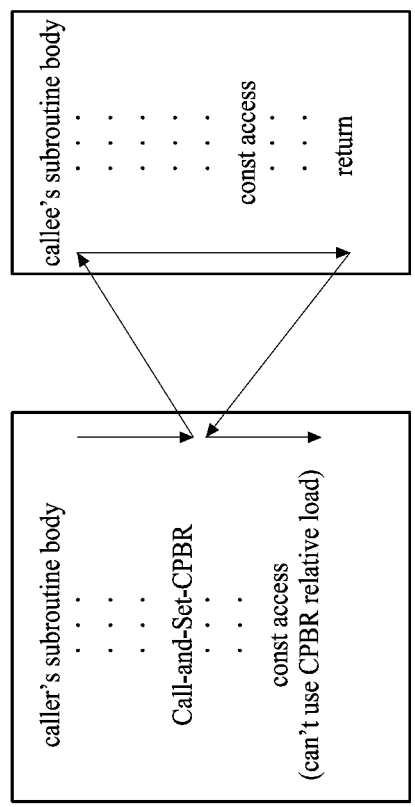
FIG. 13 illustrates setting the value of constant base address in subroutines.
Figure 14:
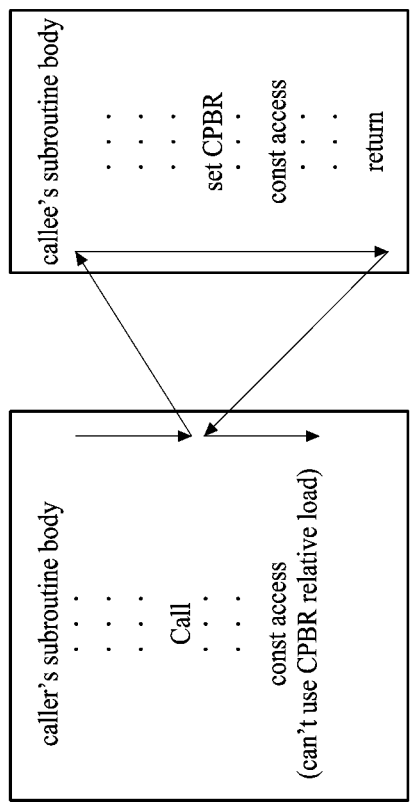
FIG. 14 illustrates setting the value of constant base address in subroutines.

FIG. 12 illustrates setting, saving, and restoring the value of constant base address in subroutines. In FIG. 12, saving, setting and restoring the value of constant pool base address are in the callee's subroutine body. FIG. 13 illustrates setting and saving the value of constant base address in subroutines. In FIG. 13, only setting the value of constant pool base address is in the caller's subroutine body. FIG. 14 illustrates setting and saving the value of constant base address in subroutines. In FIG. 14, only setting the value of constant pool base address is in the callee's subroutine body.

Although the present invention and its objectives have been described in detail, it should be understood that various changes, substitutions and alterations can be made herein without departing from the spirit and scope of the invention as defined by the appended claims. For example, many of the processes discussed above can be implemented using different methodologies, replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A constant data accessing system, comprising:
   a constant pool comprising a pool of constants;

a compiler having a constant pool handler, the constant pool handler accessing the constants;

an instruction set module having a constant pool base register management instruction set unit and a constant pool access instruction set unit;

a computer processor having a constant pool base register configured to store a value of a constant pool base address, wherein the value of the constant pool base address is an address of a subroutine, and the subroutine comprises the constants;

instructions, in the constant pool base register management instruction set unit, configured to manage the value of the constant pool base address, wherein the operation of managing comprises saving, setting, or restoring the value of the constant pool base register, and the operation of managing is performed before accessing the one or the plurality of constants; and instructions, in the constant pool access instruction set unit, configured to access the constants, using the constant pool base register.

2. The constant data accessing system of claim 1, wherein the constant pool base register is a specific register or one of a plurality of general purpose registers in the computer processor.

3. The constant data accessing system of claim 1, wherein the constant pool base register management instruction set unit includes a subroutine call instruction, a Push-CPBR-and-Call-and-Set-CPBR.

4. The constant data accessing system of claim 1, wherein the constant pool base register management instruction set unit includes a subroutine instruction covering an operation of a Push-CPBR-and-Set-CPBR.

5. A computer processor supporting an instruction set module, the computer processor comprising:
    a constant pool comprising a pool of constants;
    a constant pool base register configured to store a value of a constant pool base address, wherein the value of the constant pool base address is an address of a subroutine, and the subroutine comprises the constants;
    wherein the instruction set module comprises a constant pool base register management instruction set unit and a constant pool access instruction set unit;
    instructions, in the constant pool base register management instruction set unit, configured to manage the value of the constant pool base address, wherein the operation of managing comprises saving, setting, or restoring the value of the constant pool base register, and the operation of managing is performed before accessing the one or the plurality of constants; and
    instructions, in the constant pool access instruction set unit, configured to access the constants, using the constant pool base register.

6. The computer processor of claim 5 is configured to receive machine codes compiled by a compiler having a constant pool handler.

7. The computer processor of claim 5, wherein the constant pool base register is a specific register or one of a plurality of general purpose registers in the computer processor.

8. The computer processor of claim 5, wherein the constant pool base register management instruction set unit includes a subroutine call instruction, a Push-CPBR-and-Call-and-Set-CPBR.

9. The computer processor of claim 5, wherein the constant pool base register management instruction set unit includes a subroutine instruction covering an operation of a Push-CPBR-and-Set-CPBR.

10. A method of accessing a constant in at least one subroutine, the method comprising the steps of:
    placing one or a plurality of constants in a constant pool for the subroutine;
    determining a value of a constant pool base address, wherein the value of the constant pool base address is an address of the subroutine, and the subroutine comprises the constants;
    managing the value of the constant pool base address in a constant pool base register, wherein the operation of managing comprises:
    saving a current value of the constant pool base register and setting a new value of the constant pool base register to an address of a second subroutine upon calling a second subroutine; and
    restoring the value of the constant pool base register to a prior saved value of the constant pool base register upon returning to a first subroutine; and
    accessing the one or the plurality of constants with instructions by calculating the address of the one or the plurality of constants in a constant pool using the constant pool base register.

11. The constant data accessing method of claim 10, wherein the constant pool is located before or after a subroutine.

12. The constant data accessing method of claim 10, wherein the constant pool base address is located before or at a starting address of the constant pool, or between the starting address of the constant pool and an ending address of the constant pool, or after or at the ending address of the constant pool.

13. The method of claim 11, wherein the constant pool is just before or just after a subroutine that uses constants in the constant pool.

14. The constant data accessing method of claim 10, wherein the constant pool base register management instruction set unit includes a subroutine call instruction, a Push-CPBR-and-Call-and-Set-CPBR.

15. The constant data accessing method of claim 10, wherein the constant pool base register management instruction set unit includes a subroutine instruction covering an operation of a Push-CPBR-and-Set-CPBR.

* * * * *